United States Patent
Okubo et al.

(10) Patent No.: US 9,455,616 B2
(45) Date of Patent: Sep. 27, 2016

(54) BRUSHLESS MOTOR CONTROL METHOD AND BRUSHLESS MOTOR CONTROL DEVICE AND ELECTRIC POWER STEERING DEVICE

(71) Applicant: MITSUBA Corporation, Gunma (JP)

(72) Inventors: Masayuki Okubo, Gunma (JP); Keisuke Mitsuoka, Gunma (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 14/651,319

(22) PCT Filed: Dec. 9, 2013

(86) PCT No.: PCT/JP2013/082970
§ 371 (c)(1),
(2) Date: Jun. 11, 2015

(87) PCT Pub. No.: WO2014/097918
PCT Pub. Date: Jun. 26, 2014

(65) Prior Publication Data
US 2015/0318808 A1 Nov. 5, 2015

(30) Foreign Application Priority Data
Dec. 17, 2012 (JP) ................... 2012-275038

(51) Int. Cl.
*H02P 21/00* (2016.01)
*H02K 29/03* (2006.01)
(Continued)

(52) U.S. Cl.
CPC ............. *H02K 29/03* (2013.01); *H02K 1/2706* (2013.01); *H02P 6/10* (2013.01); *H02P 21/00* (2013.01); *H02P 27/04* (2013.01); *H02P 2207/05* (2013.01)

(58) Field of Classification Search
CPC ..... B60L 2220/12; H02K 29/03; H02P 6/10; H02P 21/00
See application file for complete search history.

(56) References Cited

U.S. PATENT DOCUMENTS

2002/0097015 A1 7/2002 Kitajima et al.
2011/0074239 A1* 3/2011 Nishiyama ............... H02K 3/28
310/195

FOREIGN PATENT DOCUMENTS

JP 2002-247899 8/2002
JP 2004-32944 1/2004
(Continued)

OTHER PUBLICATIONS

International Search Report (ISR) issued Jan. 7, 2014 in International (PCT) Application No. PCT/JP2013/082970.
(Continued)

*Primary Examiner* — Karen Masih
(74) *Attorney, Agent, or Firm* — Wenderoth, Lind & Ponack, L.L.P.

(57) ABSTRACT

A control device 50 that drives and controls a brushless motor 3 of a four-pole 24-slot configuration includes: a base current calculation section 52 that calculates fundamental-wave current indicating a winding current value associated with maximum torque control; a correction component calculation section 59 that calculates $12^{th}$-order first higher harmonic wave component $B \sin 12(\theta+\beta)$ to cancel a torque ripple of magnet torque, and $12^{th}$-order second higher harmonic wave component $A \sin 12(\theta+\alpha)$ to cancel a torque ripple of reluctance torque, based on a phase current value detected by a current sensor 64; a correction map 58 in which relation between phase current and parameters A, B, $\alpha$, and $\beta$ of the both higher harmonic wave components is stored; and a current correction section 60 that corrects supply current by superimposing each $12^{th}$-order higher harmonic wave component on the fundamental-wave current in order to create current command values Id' and Iq'.

18 Claims, 9 Drawing Sheets

(51) Int. Cl.
  *H02K 1/27*    (2006.01)
  *H02P 6/10*    (2006.01)
  *H02P 27/04*   (2016.01)

(56) References Cited

FOREIGN PATENT DOCUMENTS

| JP | 2004-64909  | 2/2004  |
| JP | 2007-274779 | 10/2007 |
| JP | 2007-330074 | 12/2007 |
| JP | 2009-195049 | 8/2009  |
| JP | 2009-261121 | 11/2009 |
| JP | 2010-57217  | 3/2010  |
| JP | 2011-50118  | 3/2011  |
| JP | 2011-50119  | 3/2011  |
| JP | 2011-83066  | 4/2011  |

OTHER PUBLICATIONS

International Preliminary Report on Patentability in corresponding International Application No. PCT/JP2013/082970.

* cited by examiner

BRUSHLESS MOTOR CONTROL METHOD AND BRUSHLESS MOTOR CONTROL DEVICE AND ELECTRIC POWER STEERING DEVICE

TECHNICAL FIELD

The present invention relates to a torque ripple reduction technique of a brushless motor, and particularly to a technique that is effective when being applied to a magnet assistance-type reluctance motor in which a magnet is embedded in a rotor and which rotates the rotor with the help of magnet torque caused by a magnetic force of the magnet as well as reluctance torque.

BACKGROUND ART

As an electric motor of a type that generates a rotational force by using a difference in magnetic resistance between a stator and a rotor, a reluctance motor has been known. In the reluctance motor, the rotor is rotated by reluctance torque caused by a difference in magnetic resistance. However, the reluctance torque is smaller than torque obtained from a magnet. Therefore, compared with a motor that uses a magnet and is the same in size, the reluctance motor tends to have a smaller output torque. In recent years, what has been proposed is a magnet assistance-type reluctance motor that has the same basic configuration as the reluctance motor, with a magnet being disposed in the rotor. For example, Patent Document 1 discloses such a magnet assistance-type reluctance motor: a magnet is embedded in the rotor of the reluctance motor.

The magnet assistance-type reluctance motor is set in such a way that a difference in inductance between a direction of d-axis (central axis of a permanent magnet) and a direction of q-axis (which is electrically and magnetically perpendicular to d-axis) becomes large. In the rotor, reluctance torque Tr is generated. Since the permanent magnet is embedded in the rotor, magnet torque Tm is generated by the permanent magnet. Total toque Tt of the entire motor is: Tt=Tm+Tr. Therefore, the output torque is larger than the reluctance motor that only generates Tr. As a highly-efficient and high-toque motor, the magnet assistance-type reluctance motor has been widely used in recent years for electric power steering devices (which will be referred to as EPS when necessary), electric cars, hybrid cars, consumer electronics such as air conditioners, and driving sources such as those of various types of industrial machinery.

In the magnet assistance-type reluctance motor, total toque Tt is represented in the following manner. In general, so-called maximum torque control (advance angle control) is performed to maximize the torque generated for the same current.

$$Tt = Tm + Tr$$
$$= p \cdot \varphi a \cdot Iq + p \cdot (Ld - Lq) \cdot Id \cdot Iq$$

(p: number of pole pairs, φa: armature interlinkage magnetic flux by permanent magnet, Ld: d-axis inductance, Lq: q-axis inductance, Id: d-axis current, Iq: q-axis current)

During the maximum torque control, angle β between Id and Iq (current phase angle) is controlled in such a way as to generate torque in the most efficient manner with respect to armature current. The operation is conducted in a highly-efficient and high-torque manner.

However, in the magnet assistance-type reluctance motor, as the armature current increases, the ratios of magnet torque Tm and reluctance torque Tr to total torque Tt would change. Accordingly, the ratio of Tr tends to increase. In this case, since the current value is high, the effect of armature reaction becomes larger accordingly. As a result, the torque ripple becomes larger than when the current is low. In particular, after the reluctance toque exceeds 10%, the torque ripple rapidly increases. The problem is that, in the case of EPS, the torque ripple rate exceeds the upper limit or 5%.

In order to reduce the toque ripple in the magnet assistance-type reluctance motor, various methods have been proposed. For example, Patent Document 2 discloses a motor control device that calculates a torque ripple, calculates and supplies a current command value to generate an opposite-phase torque to the torque ripple in order to reduce the toque ripple. In this case, first, the toque ripple calculation means calculates a fundamental wave current in a dq coordinate system, and a toque ripple caused by higher harmonic wave components of armature interlinkage magnetic flux associated with a permanent magnet. Then, the torque ripple reduction higher harmonic wave current command value generator calculates a higher harmonic wave current command value to generate toque whose phase is opposite to that of the torque ripple calculated by the torque ripple calculation means. Then, the higher harmonic wave current control circuit controls higher harmonic wave current based on the higher harmonic wave current command value, thereby reducing the torque ripple of the motor.

PRIOR ART DOCUMENTS

Patent Documents

[Patent Document 1] Japanese Patent Application Laid-Open Publication No. 2011-83066
[Patent Document 2] Japanese Patent Application Laid-Open. Publication No. 2004-64909
[Patent Document 3] Japanese Patent Application Laid-Open Publication No. 2009-261121
[Patent Document 4] Japanese Patent Application Laid-Open Publication No. 2007-274779
[Patent Document 5] Japanese Patent Application Laid-Open Publication No. 2009-195049
[Patent Document 6] Japanese Patent Application Laid-Open Publication No. 2009-195049

The device of Patent Document 2 can surely reduce the torque ripple. However, the device converts the sine wave of induced voltage into the dq coordinate system before calculating a higher harmonic wave current command value to generate the torque whose phase is opposite to that of the torque ripple. Therefore, the problem is that the calculation load is very large. Particularly in a device in which the current is used in a wide range and changes at every moment, such as EPS, a CPU with a very high processing power is required to carryout the above-described calculation every time. Accordingly, the problem is that the control form disclosed in Patent Document 2 is theoretically feasible, but it is difficult to put into practice.

SUMMARY OF THE INVENTION

As for a brushless motor control method of the present invention, a method of controlling a brushless motor that includes a stator, which includes an outer-side ring portion, a plurality of tooth portions protruding from the outer-side ring portion toward a radial-direction inner side, and armature windings of a plurality of phases that form a sinusoidal waveform as an induced voltage between lines via a slot formed between the tooth portions, and a rotor, in which a permanent magnet is embedded and which is disposed on an inner side of the stator in a rotatable manner, wherein the rotor is rotated by magnet torque that is caused by magnetic attraction force of the permanent magnet and by reluctance torque that is based on a difference in inductance between magnetic paths, is characterized by including: calculating fundamental-wave current indicating a winding current value by which a maximum torque is output in the brushless motor, in accordance with a load condition of the brushless motor; calculating a first higher harmonic wave component that has the same amplitude and the same cycle as a torque ripple caused by the magnet torque and is opposite in phase to the torque ripple, based on a correction map that shows relation between phase current of the armature winding and parameters that are used to calculate the first higher harmonic wave component; calculating a second higher harmonic wave component that has the same amplitude and the same cycle as a torque ripple caused by the reluctance torque with the first higher harmonic wave component being superimposed thereon and is opposite in phase to the torque ripple, based on a correction map that shows relation between phase current of the armature winding and parameters that are used to calculate the second higher harmonic wave component; and correcting current that is supplied to the armature windings by superimposing the first and second higher harmonic wave components on the fundamental-wave current.

In the case of the present invention, while maximum torque control is being carried out, current correction values that can diminish the torque ripple of magnet torque and the torque ripple of reluctance torque are set with the use of the preset correction map. In the correction map, the relation between phase current values and correction parameters is stored. A CPU determines a parameter by referencing the correction map based on a detection current value. Accordingly, the CPU does not have to constantly calculate torque ripples and to sequentially calculate command values to diminish the torque ripples. Therefore, it is possible to significantly reduce the load on the CPU at the time of controlling the motor while curbing torque ripples of the brushless motor.

According to the brushless motor control method, the rotor may include a plurality of arc-shaped slits, a plurality of magnets that are housed in the slits, and a plurality of magnetic pole portions that are formed by the magnets and disposed along a circumferential direction of the rotor; and the slits may be provided along an arc that has a center point outside the rotor, and the slits may be formed inside the rotor in such a way that protruding-side portions of the slits face center of the rotor.

According to the brushless motor control method, the correction maps may include: a higher harmonic wave coefficient map that shows relation between phase current of the armature windings and amplitudes of the first and second higher harmonic wave components; and a phase adjustment map that shows relation between phase current of the armature windings and phase shifts between torque ripple waveforms and the first and second higher harmonic wave components. Moreover, as the first higher harmonic wave component, $B \sin 12(\theta+\beta)$ (B: Higher harmonic wave amplitude coefficient, $\theta$: Rotational angle (electrical angle), $\beta$: Phase shift) that is added to q-axis-direction fundamental-wave current Iqb may be set; as the second higher harmonic wave component, $A \sin 12(\theta+\alpha)$ (A: Higher harmonic wave amplitude coefficient, $\theta$: Rotational angle (electrical angle), $\alpha$: Phase shift) that is added to d-axis-direction fundamental-wave current Idb may be set; in the higher harmonic wave coefficient map, relation between phase current of the armature windings and the higher harmonic wave amplitude coefficients A and B may be stored; and in the phase adjustment map, relation between phase current of the armature windings and the phase shifts $\alpha$ and $\beta$ may be stored.

The first and second higher harmonic wave components may be superimposed on the fundamental-wave current in a high load region where a torque ripple rate in the brushless motor exceeds 5%. Moreover, the brushless motor may be used as a driving source of an electric power steering device.

As for a brushless motor control device of the present invention, a control device of a brushless motor that includes a stator, which includes an outer-side ring portion, a plurality of tooth portions protruding from the outer-side ring portion toward a radial-direction inner side, and armature windings of a plurality of phases that form a sinusoidal waveform as an induced voltage between lines via a slot formed between the tooth portions, and a rotor, in which a permanent magnet is embedded and which is disposed on an inner side of the stator in a rotatable manner, wherein the rotor is rotated by magnet torque that is caused by magnetic attraction force of the permanent magnet and by reluctance torque that is based on a difference in inductance between magnetic paths, is characterized by including: a current sensor that detects phase current of the armature windings; a base current calculation section that calculates fundamental-wave current indicating a winding current value by which a maximum torque is output in the brushless motor, in accordance with a load condition of the brushless motor; a correction component calculation section that calculates, based on a phase current value detected by the current sensor, a first higher harmonic wave component that has the same amplitude and the same cycle as a torque ripple caused by the magnet torque and is opposite in phase to the torque ripple, and a second higher harmonic wave component that has the same amplitude and the same cycle as a torque ripple caused by the reluctance torque with the first higher harmonic wave component being superimposed thereon and is opposite in phase to the torque ripple; a correction map that shows relation between the phase current and parameters that are used to calculate the first and second higher harmonic wave components; and a current correction section that corrects current that is supplied to the armature windings by superimposing the first and second higher harmonic wave components calculated by the correction component calculation section on the fundamental-wave current.

In the case of the present invention, the base current calculation section calculates the fundamental-wave current at the time of maximum torque control, and the correction component calculation section calculates the first and second higher harmonic wave components that can diminish the torque ripple of magnet torque and the torque ripple of reluctance torque, by using the preset correction map. In the correction map, the relation between phase current values and correction parameters is stored. The correction component calculation section determines a parameter by referencing the correction map based on a detection current value, and calculates the first and second higher harmonic wave components. The current correction section corrects the fundamental-wave current based on the calculated first and second higher harmonic wave components. Accordingly, the control device does not have to constantly calculate torque ripples and to sequentially calculate command values to diminish the torque ripples. Therefore, it is possible to significantly reduce the load on the CPU at the time of control ling the motor while curbing torque ripples of the brushless motor.

In the brushless motor control device, the rotor may include a plurality of arc-shaped slits, a plurality of magnets that are housed in the slits, and a plurality of magnetic pole portions that are formed by the magnets and disposed along a circumferential direction of the rotor; and the slits may be provided along an arc that has a center point outside the rotor, and the slits may be formed inside the rotor in such a way that protruding-side portions of the slits face center of the rotor.

In the brushless motor control device, the correction map may include: a higher harmonic wave coefficient map that shows relation between phase current of the armature windings and amplitudes of the first and second higher harmonic wave components; and a phase adjustment map that shows relation between phase current of the armature windings and phase shifts between torque ripple waveforms and the first and second higher harmonic wave components. Moreover, the brushless motor may be used as a driving source of an electric power steering device.

As for an electric power steering device of the present invention, an electric power steering device that uses, as a driving source, a brushless motor that includes a stator, which includes an outer-side ring portion, a plurality of tooth portions protruding from the outer-side ring portion toward a radial-direction inner side, and armature windings of a plurality of phases that form a sinusoidal waveform as an induced voltage between lines via a slot formed between the tooth portions, and a rotor, in which a permanent magnet is embedded and which is disposed on an inner side of the stator in a rotatable manner, wherein the rotor is rotated by magnet torque that is caused by magnetic attraction force of the permanent magnet and by reluctance torque that is based on a difference in inductance between magnetic paths, is characterized by: calculating fundamental-wave current indicating a winding current value by which a maximum torque is output in the brushless motor, in accordance with a load condition of the brushless motor; calculating a first higher harmonic wave component that has the same amplitude and the same cycle as a torque ripple caused by the magnet torque and is opposite in phase to the torque ripple, based on a correction map that shows relation between phase current of the armature winding and parameters that are used to calculate the first higher harmonic wave component; calculating a second higher harmonic wave component that has the same amplitude and the same cycle as a torque ripple caused by the reluctance torque with the first higher harmonic wave component being superimposed thereon and is opposite in phase to the torque ripple, based on a correction map that shows relation between phase current of the armature winding and parameters that are used to calculate the second higher harmonic wave component; and correcting current that is supplied to the armature windings by superimposing the first and second higher harmonic wave components on the fundamental-wave current.

In the case of the present invention, in the electric power steering device that uses the brushless motor as a driving source, while maximum torque control is being carried out, current correction values that can diminish the torque ripple of magnet torque and the torque ripple of reluctance torque are set with the use of the preset correction map. In the correction map, the relation between phase current values and correction parameters is stored. A CPU determines a parameter by referencing the correction map based on a detection current value. Accordingly, the CPU does not have to constantly calculate torque ripples and to sequentially calculate command values to diminish the torque ripples. Therefore, it is possible to significantly reduce the load on the CPU at the time of controlling the motor while curbing torque ripples of the brushless motor. Moreover, the torque ripples can be kept less than or equal to a predetermined value (e.g., 5%). Therefore, it is possible to improve the steering feeling.

In the electric power steering device, the rotor may include a plurality of arc-shaped slits, a plurality of magnets that are housed in the slits, and a plurality of magnetic pole portions that are formed by the magnets and disposed along a circumferential direction of the rotor; and the slits may be provided along an arc that has a center point outside the rotor, and the slits may be formed inside the rotor in such a way that protruding-side portions of the slits face center of the rotor.

Advantages of the Invention

According to the brushless motor control method and control device of the present invention, the preset correction maps are incorporated into the control, and the higher harmonic wave components that are used to reduce torque ripples are calculated with the use of the correction maps. Therefore, compared with the conventional control form, the calculation load on the CPU can be significantly reduced. Thus, without using high-performance CPU, it is possible to reduce torque ripples of the brushless motor and lower system costs.

According to the electric power steering device of the present invention, for the driving and controlling of the brushless motor that is used as a driving source thereof, the preset correction maps are incorporated into the control, and the higher harmonic wave components that are used to reduce torque ripples are calculated with the use of the correction maps. Therefore, compared with the conventional BPS, the calculation load on the CPU can be significantly reduced. Thus, without using high-performance CPU, it is possible to reduce torque ripples of the brushless motor, improve the steering feeling, and lower system costs of the EPS.

DETAILED DESCRIPTION OF THE INVENTION

Figure 1:
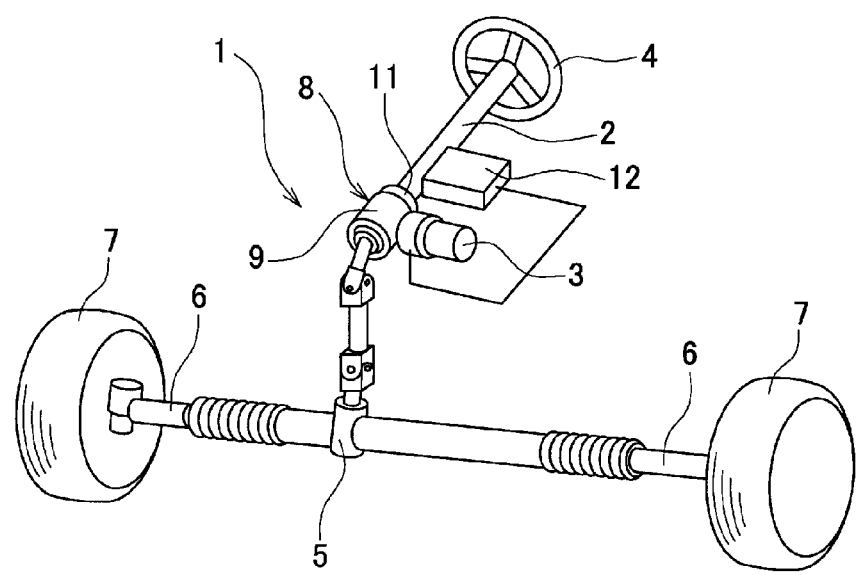
FIG. 1 is an explanatory diagram showing the configuration of EPS that uses a brushless motor.

Hereinafter, an embodiment of the present invention will be described in detail based on the accompanying drawings. The object of the present embodiment is to provide a motor control method and device that can reduce torque ripples of a brushless motor without imposing a large calculation load on CPU. FIG. 1 is an explanatory diagram showing the configuration of EPS that uses a brushless motor; a control process of the present invention is carried out. An electric power steering device (EPS) 1 of FIG. 1 is of a column assist type that gives an operation assistance force to a steering shaft 2. In the EPS 1, the brushless motor 3 (which will be referred to as motor 3) is used as a power source.

To the steering shaft 2, a steering wheel 4 is attached. A steering force of the steering wheel 4 is transmitted to a tie rod 6 via a pinion and rack shaft that are disposed in a steering gear box 5 and are not shown in the diagram. To both ends of the tie rod 6, wheels 7 are connected. As the steering wheel 4 is operated, the tie rod 6 works, thereby turning the wheels 7 to the left and right via a knuckle arm and the like, which are not shown in the diagram.

In the EPS 1, an assist motor unit 8, which is a steering force assistance mechanism, is provided on the steering shaft 2. In the assist motor unit 8, the motor 3, a speed reduction mechanism unit 9, and a torque sensor 11 are provided. In the speed reduction mechanism unit 9, a worm and worm wheel, which are not shown in the diagram, are disposed. The rotation of the motor 3 is transmitted to the steering shaft 2 after the speed is reduced by the speed reduction mechanism unit 9. The motor 3 and the torque sensor 11 are connected to a control device (ECU) 12.

After the steering wheel 4 is operated and the steering shaft 2 is rotated, the torque sensor 11 starts to operate. The ECU 12 appropriately supplies power to the motor 3 based on the torque detected by the torque sensor 11. After the motor 3 starts to operate, the rotation thereof is transmitted to the steering shaft 2 via the speed reduction mechanism unit 9, thereby giving a steering assistance force. The steering shaft 2 is rotated by the steering assistance force and a manual steering force. The rotation of the steering shaft 2 is transformed into linear motion of the rack shaft via a rack and pinion coupling in the steering gear box 5. In this manner, the steering operation of the wheels 7 is performed.

Figure 2:
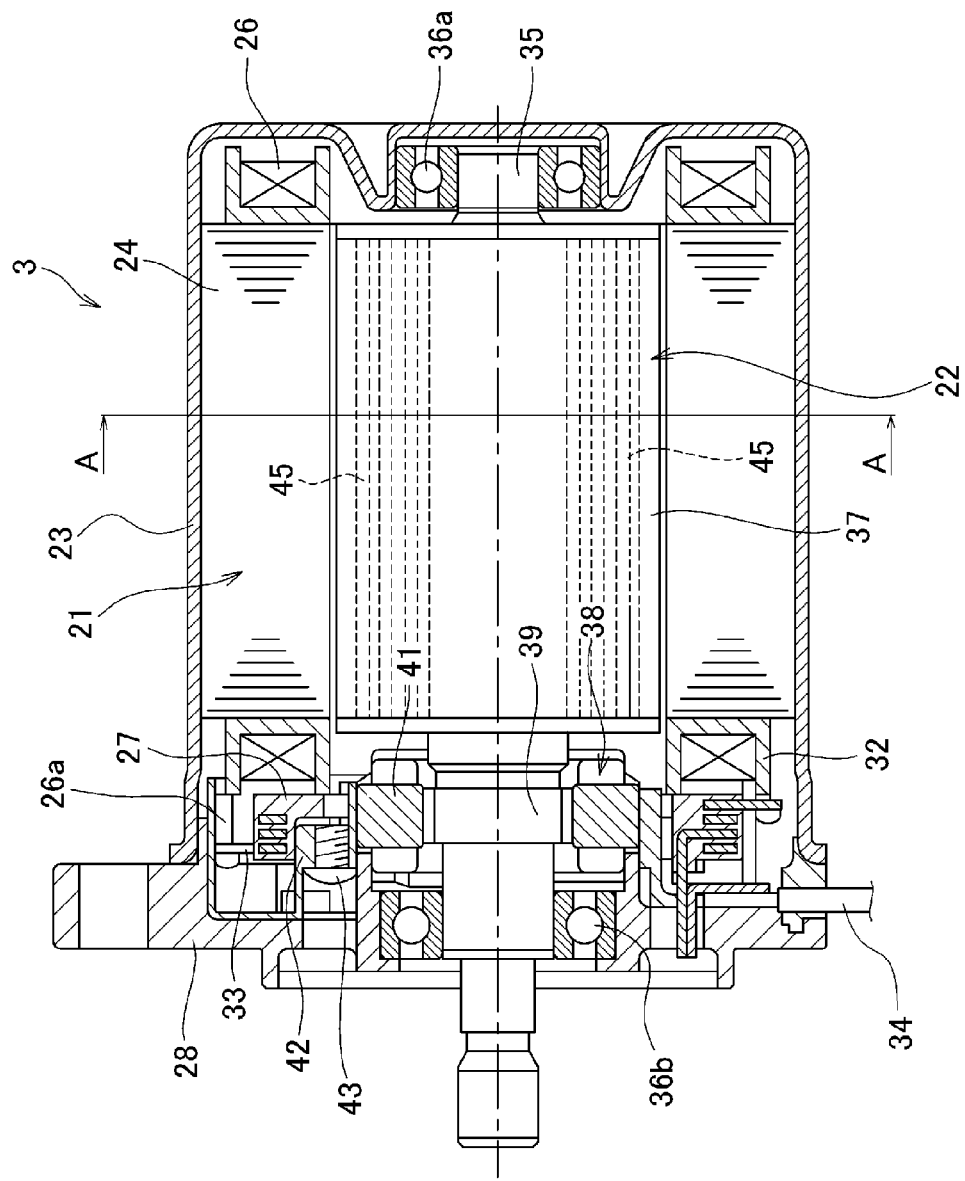
FIG. 2 is a cross-sectional view showing the configuration of a brushless motor (4P24S) that is used in the EPS of FIG. 1.
Figure 3:
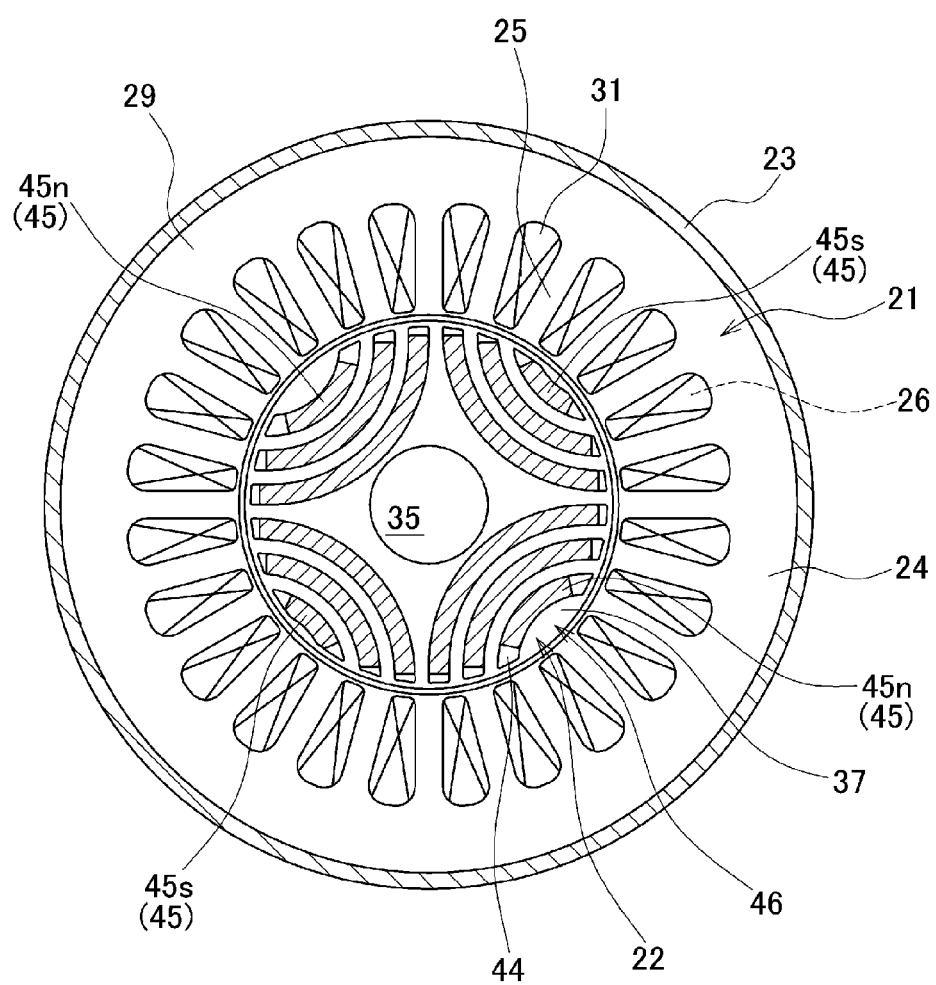
FIG. 3 is a cross-sectional view of FIG. 2 taken along line A-A.

FIG. 2 is a cross-sectional view of the motor 3. FIG. 3 is a cross-sectional view of FIG. 2 taken along line A-A. The motor 3 is based on a reluctance motor, and a magnet is disposed in a rotor. Therefore, the motor 3 is a magnet assistance-type reluctance motor that uses the magnetic force of the magnet as auxiliary force. The motor 3 is used as a driving source for the electric power steering device. As shown in FIG. 2, the motor 3 is an inner rotor-type brushless motor in which an outer-side stator (stator) 21 and an inner-side rotor (rotor) 22 are disposed as in a normal reluctance motor.

The stator 21 is fixed to an inner side of a motor case 23 (which will be referred to as case 23) that is in a bottomed cylindrical shape. The stator 21 includes a stator core 24; a stator winding 26 (which will be referred to as winding 26), which is wound around a tooth portion 25 of the stator core 24; and a bus bar unit (terminal unit) 27. The bus bar unit 27 is mounted on the stator core 24 and is electrically connected to the winding 26. The case 23 is made of iron or the like and is formed into a bottomed cylindrical shape. To an opening of the case 23, an aluminum die-cast bracket 28 is mounted with fixing screws, which are not shown in the diagrams.

The stator core 24 is made up of steel plates (e.g., electromagnetic steel sheets) that are stacked. The stator core 24 includes an outer-side ring portion 29 and tooth portions 25. From the outer-side ring portion 29, a plurality of tooth portions 25 (24 tooth portions in this case) are provided in such a way as to protrude toward a radial-direction inner side. Between adjacent tooth portions 25, a slot 31 is formed. As described above, the motor 3 has 24 tooth portions 25 and therefore is a 24-slot configuration. Inside the slot 31, the winding 26 is housed in a distributed winding manner. On the stator core 24, an insulator 32 that is made of synthetic resin is mounted. On the outer side of the insulator 32, the winding 26 is wound.

To one end of the stator core 24, the bus bar unit 27 is attached. The bus bar unit 27 includes a body portion, which is made of synthetic resin, and a bus bar, which is insert-molded in the body portion and is made of copper. Around the bus bar unit 27, a plurality of power supply terminals 33 are provided in such a way as to protrude in the radial direction. When the bus bar unit 27 is to be attached, the power supply terminals 33 are welded to an end 26a of the winding 26 that is pulled out from the stator core 24. In the bus par unit 27, the number of bus bars provided is dependent on the number of phases of the motor 3 (In this case, a total of four bus bars are provided for three phases, U-phase, V-phase, and W-phase, with one bus bar used to connect the phases). Each winding 26 is electrically connected to the power supply terminal 33 corresponding to the phase thereof. To the winding 26, from a battery, which is not shown in the diagrams, trapezoidal wave-shape phase current (U, V, W), which contains higher harmonic wave components, is supplied via a power supply wire 34. After the bus bar unit 27 is mounted, the stator core 24 is pressed and fixed into the case 23.

Into the inner portion of the stator 21, the rotor 22 is inserted. The rotor 22 includes a rotational shaft 35. The rotational shaft 35 is pivotally supported by bearings 36a and 36b in a rotatable manner. The bearings 36a are fixed at the center of a bottom portion of the case 23. The bearings 36b are fixed at a central portion of the bracket 28. The rotational shaft 35 is connected to a worm shaft of the speed reduction mechanism unit 9 via a joint member, which is not shown in the diagrams. On the worm shaft, a worm is formed. The worm engages with a worm wheel that is fixed to the steering shaft 2 in the speed reduction mechanism unit 9.

To the rotational shaft 35, a cylindrical rotor core 37 and a rotor (resolver rotor) 39 of a resolver 38, which is a rotation angle detection means, are attached. A stator (resolver stator) 41 of the resolver 38 is housed in a resolver bracket 42, which is made of synthetic resin. The resolver bracket 42 is fixed to the inner side of the bracket 28 with mounting screws 43. Around the resolver stator 41, coils are wound; an excitation coil, and a detection coil are provided. On the inner side of the resolver stator 41, the resolver rotor 39 is disposed. The resolver rotor 39 is made up of metal plates that are stacked; convex portions are provided in three directions.

As the rotational shaft 35 rotates, the resolver rotor 39 rotates inside the resolver stator 41. To the excitation coil of the resolver stator 41, higher frequency signals are supplied. As the convex portions move closer to or away from the coil during the rotation of the resolver rotor 39, there is a change in the phase of the signal output from the detection coil. By comparing the detection signal with a reference signal, it is possible to detect the rotation position of the rotor 22. Based on the rotation position of the rotor 22, the current being supplied to the winding 26 is appropriately switched, and the rotor 22 is therefore rotated and driven.

The rotor core 37, too, is made up of a number of disc-shaped electromagnetic steel plates that are stacked. On the steel plates that make up the rotor core 37, a plurality of arc-shaped slits 44 are provided. There is space inside the slit 44. The slits 44 function as flux barriers so that the magnetic resistance of the rotor 22 varies along the rotational direction. The slits 44 are provided along arcs that are formed around an imaginary point which is not shown in the diagram and set outside an outer periphery of the rotor 22. The slits 44 are formed inside the rotor in such a way that the convex-side portions of the slits 44 face the center of the rotor 22.

The direction of magnetic flux that a magnetic pole makes (or the central axis of a permanent magnet) is referred to as d-axis, and an axis that is magnetically perpendicular to d-axis (or the axis between permanent magnets) is set as q-axis. A plurality of sets of slits 44 are provided, with q-axis, which is perpendicular to the rotational shaft 35, as a boundary. In the case of the motor 3, four sets of a plurality of slits 44 are provided in an arc-shaped pattern. In each set of slits 44, a plurality of layers of magnetic paths are formed.

In order to achieve an improvement in the output, in the case of the motor 3, magnets (permanent magnets) 45 are disposed inside the slits 44. That is, the motor 3 is of an IPM (Interior Permanent Magnet) motor configuration. At the site of each magnet 45, a magnetic pole portion 46 is formed along the circumferential direction. In the case of the motor 3, reluctance torque serves as main force, and magnet torque serves as auxiliary force. Accordingly, as the magnets 45, inexpensive ferrite magnets are used. Instead, in order to further boost the output, as the magnets 45, rare earth magnets, such as neodymium bond magnets, may be used. The magnets 45, which are disposed in the slits 44, are formed in advance into the shape of the corresponding slits 44. Each magnet 45 is fixed in the slits 44 with fixing means such as adhesive.

In the rotor 22, as a plurality of magnets 45 that form the magnetic pole portions 46, magnets 45s whose outer peripheral side is S-pole, and magnets 45n whose outer peripheral side is N-pole are provided. The rotor 22 is of a four-pole configuration, including four magnetic pole portions 46. Therefore, the motor 3 is of a four-pole 24-slot (4P24S) configuration. The magnets 45 of each pole are formed into an arc shape. In each set, three magnets 45 are provided along the radial direction. In the rotor 22, a plurality of d-axes and q-axes are alternately formed in the circumferential direction. The motor 3 has such a magnetic pole configuration. Therefore, it is possible to enhance the torque with the help of magnet torque while making effective use of reluctance torque.

In the rotor 22, as described above, the direction of magnetic flux that a magnetic pole makes is referred to as d-axis, and an axis that is magnetically perpendicular to d-axis is referred to as q-axis. In the rotor 22, a plurality of d-axes and q-axes are set. In this case, d-axes and q-axes are alternately provided along the circumferential direction. In the rotor 22, the arc-shaped slits 44 are provided to allow smooth passage of q-axis magnetic flux. In the slits 44, the arc-shaped magnets 45 are embedded. That is, the rotor 22 is configured in such a way as to allow smooth passage of q-axis magnetic flux and increase inductance Lq. Therefore, it is possible to increase the magnet torque associated with the magnets 45. As a result, it is possible to obtain a sufficient torque even with ferrite magnets.

In the EPS1, when the rotation of the steering shaft 2 starts in response to the operation of the steering wheel 4, the rack shaft moves in the direction corresponding to the rotation. In this manner, the steering operation is performed. In response to the steering operation, the torque sensor 11 starts to operate. Based on the torque detected by the torque sensor 11, power is supplied from a battery, which is not shown in the diagrams, to the winding 26 via the power supply wire 34. When power is supplied to the winding 26, the motor 3 starts to operate, and the rotational shaft 35 and the worm shaft are rotated. The rotation of the worm shaft is conveyed to the steering shaft 2 via the worm wheel, thereby assisting the steering force.

Figure 4:
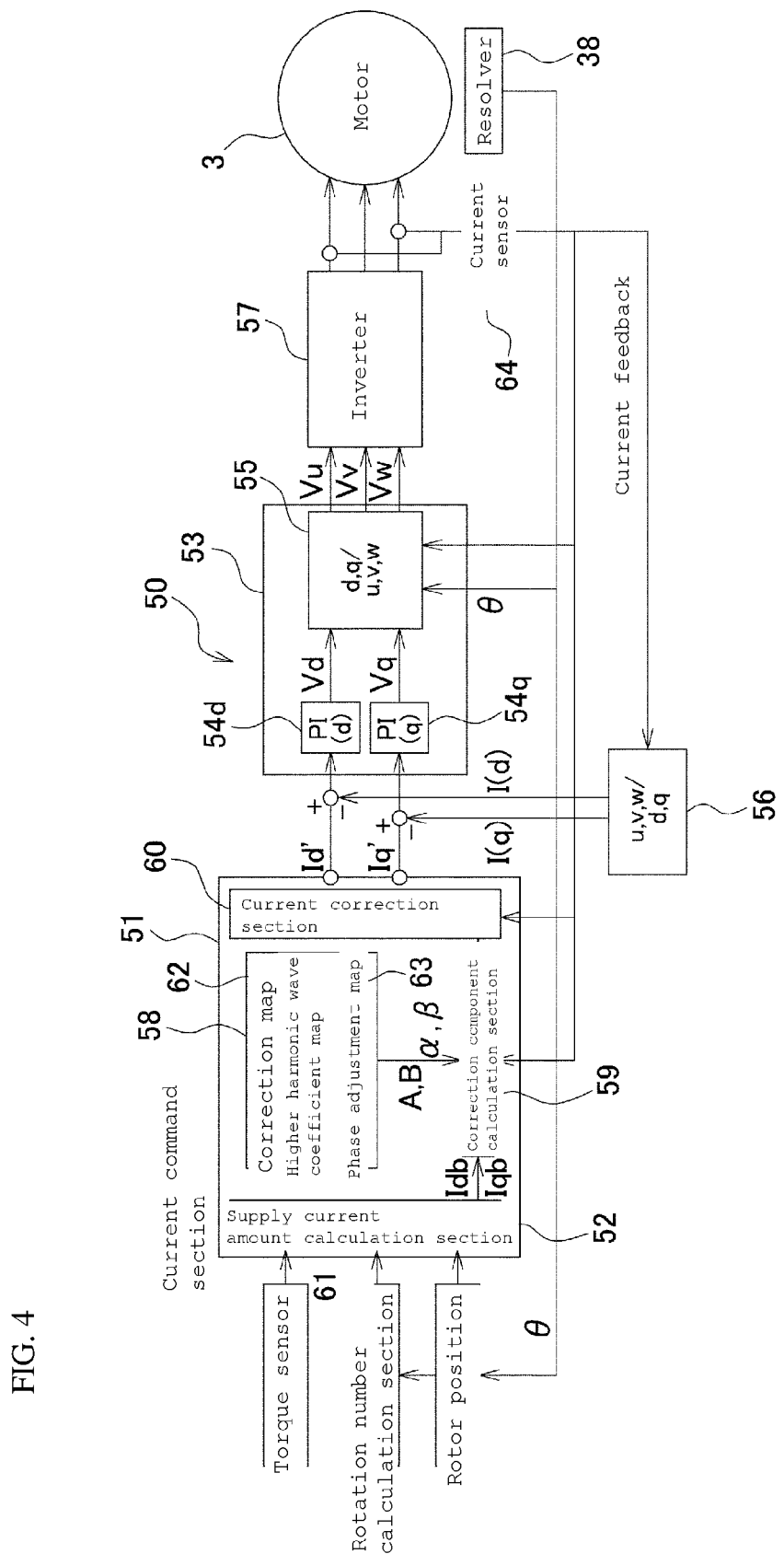
FIG. 4 is a block diagram showing the configuration of a control device in the EPS of FIG. 1.

FIG. 4 is a block diagram showing the configuration of a control device 50 of the EPS 1. A control method of the present invention is carried out by the control device 50. As described above, the EPS 1 is driven and controlled based on the value detected by the torque sensor 11 and rotation position information of the rotor 22 detected by the resolver 38. As shown in FIG. 4, for the motor 3, the resolver 38 is disposed as an angle sensor. The rotor rotation position is sequentially input to a current command section 51 from the resolver 38 as rotor rotation position information. As the steering wheel 4 is operated, a torque value (motor load information), which is the load on the motor 3, is input from the torque sensor 11 to the current command section 51 as motor load information. Ahead of the current command section 51, a rotor rotation number calculation section 61 is provided to calculate the number of rotations of the rotor 22 based on the rotor rotation position information. To the current command section 51, the rotor rotation number information is also input from the rotor rotation number calculation section 61.

In the current command section 51, a base current calculation section 52 is provided to perform an arithmetic process based on the above-described detected value to calculate the amount of base current to be supplied to the motor 3. The base current calculation section 52 calculates the amount of current to be supplied to the motor 3 based on the rotor rotation position information from the resolver 38, the rotor rotation number information, and the motor load information. The base current calculation section 52 calculates fundamental-wave current Idb and Iqb of Id and Iq that can obtain a maximum torque for d-axis (orthogonal coordinate system component that does not contribute to the torque) and q-axis (orthogonal coordinate system component that contributes to the torque), as the amount of supply current.

The current command section 51 also includes a correction map 58 to diminish a torque ripple of magnet torque Tm and a torque ripple of reluctance torque Tr. The correction map 58 that is unique to each motor is provided because both torque ripples associated with motor current vary according to each motor. In the correction map 58, each of the torque ripples of Tm and Tr has been examined in advance, correction data (higher harmonic wave coefficient map 62 and phase adjustment map 63) are stored to correct fundamental-wave current Idb and Iqb in such a way as to diminish each torque ripple. The correction data of the correction map 58 can be obtained in advance through experiments or analysis. In this case, the relation between phase current values of the winding 26 and correction parameters is stored.

The current command section 51 further includes a correction component calculation section 59 and a current correction section 60. To the correction component calculation section 59 and the current correction section 60, a current value of the motor 3 detected by a current sensor 64 is fed back. First, the current correction section 60 corrects the fundamental-wave current Idb and Iqb calculated by the base current calculation section 52 by using the correction map 58, and outputs the results to a vector control section 53 as current command values Id' and Iq'. At this time, the correction component calculation section 59 uses the correction map 58 to obtain a correction parameter from a phase current value detected by the current sensor 64. Based on the obtained correction parameter, the current correction section. 60 superimposes a predetermined higher harmonic component on the fundamental-wave current Idb and Iqb to create the current command values Id' and Iq'.

The vector control section 53 includes a d-axis PI (proportional-integral) control section 54d and a q-axis PI (proportional-integral) control section 54q and a coordinate axis conversion section (dq/UVW) 55. The current command values Id' and Iq' are input to the PI control sections 54d and 54q, respectively. To the PI control sections 54d and 54q, detection current values I(d) and I(q), which are obtained by performing dq-axis conversion of motor current values of three phases (U, V, and W) through a coordinate axis conversion section (UVW/dq) 56, are input. The PI control sections 54d and 54q perform a PI arithmetic process based on the current command values Id' and Iq' and the detection current values I(d) and I(q) to calculate d- and q-axis voltage command values Vd and Vq. The voltage command values Vd and Vq are input to the coordinate axis conversion section 55 where the voltage command values Vd and Vq are converted into voltage command values Vu, Vv, and Vw of three phases (U, V, and W) before being output. The voltage command values Vu, Vv, and Vw that are output from the coordinate axis conversion section 55 are applied to the motor 3 via an inverter 57.

As described above, total torque Tt of the motor 3 is represented by:

$$Tt = Tm + Tr$$
$$= p \cdot \varphi a \cdot Iq + p \cdot (Ld - Lq) \cdot Id \cdot Iq$$

However, while the torque ripple of Tm and the torque ripple of Tr are different, both contain Iq. Accordingly, even if Iq is set in such a way as to diminish the torque ripple of Tm or Tr, the other torque ripple cannot be diminished. Moreover, Tr contains Id. Therefore, it is very difficult to diminish the torque ripples of the entire motor at once by individually extracting Tm and Tr from Tt at the time of driving the motor and simultaneously reducing the torque ripples of Tm and Tr.

In the case of the present invention, the torque ripples are separated into the torque ripple of Tm and the torque ripple of Tr from the beginning. Then, a value of Iq is set in order to diminish the torque ripple of Tm. After that, based on the corrected value of Iq, a value of Id is set in order to diminish the torque ripple of Tr. At this time, unlike a conventional process, the control process of the present invention does not sequentially calculate torque ripples. In view of the nature of the torque ripple (waveform), the control process of the present invention adds a higher harmonic wave component of a waveform that cancels out the torque ripple, based on the correction map. The correction map 58 shows the relation between phase current and parameters that are used to set the higher harmonic wave components. By using the correction map 58, it is possible to immediately calculate a to-be-superimposed higher harmonic wave component from an effective value of the phase current of the motor 3 detected by the current sensor 64. By adding the higher harmonic wave component to the fundamental-wave current, it is possible to set the current command values Id' and Iq' that contain components aimed at simultaneously canceling out the torque ripples of Tm and Tr, thereby diminishing the torque ripples of the entire motor at once. The above-described control process will be described in more detail based on FIGS. 5A-7D.

Figure 5A:
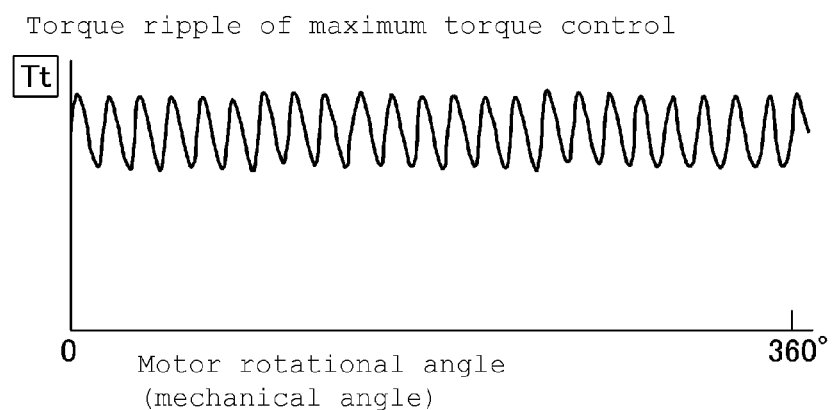
FIGS. 5A and 5B are explanatory diagrams showing torque ripples of Tm and Tr.
Figure 5B:
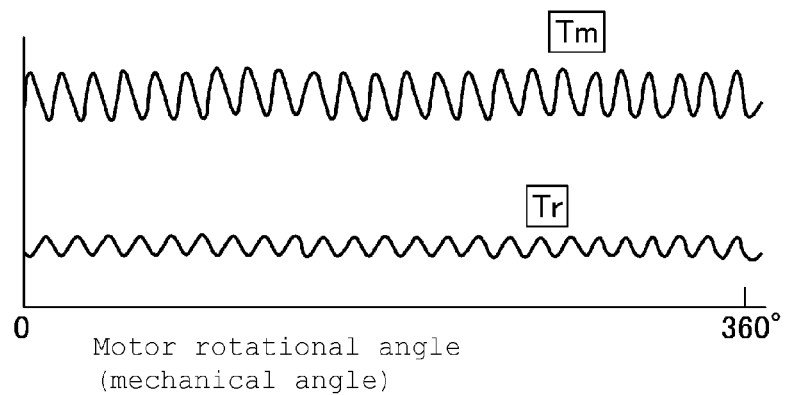
Figure 6A:
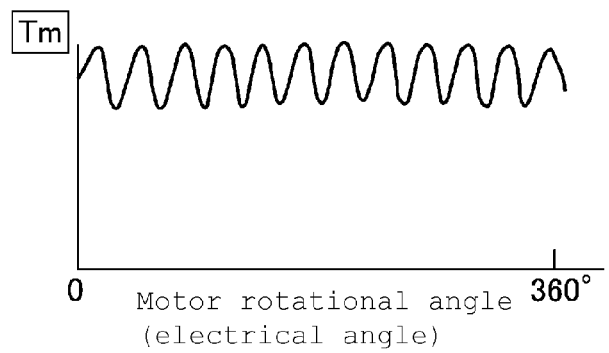
FIGS. 6A-6D are explanatory diagrams showing a process of diminishing torque ripple of Tm.
Figure 6B:
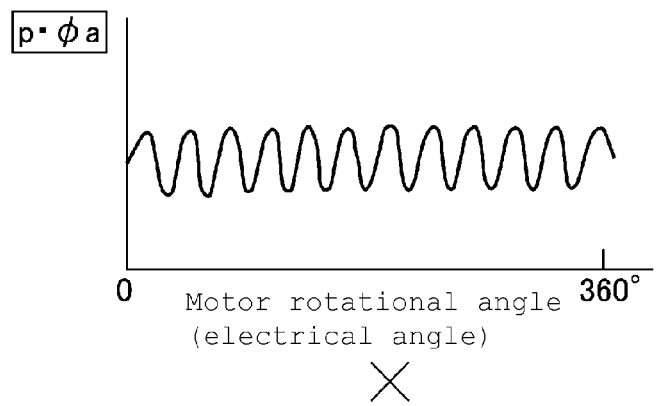

As shown in FIG. 5A, in a four-pole 24-slot motor, as in the motor 3, per rotation of the rotor (Mechanical angle: 360 degrees), torque ripples with 24 peaks are generated for both Tm and Tr. However, the torque ripples of Tm and Tr are different in phase and amplitude (FIG. 5B), and opposite-phase higher harmonic wave components cannot be set in such a way as to diminish both at the same time. Accordingly, as described above, the torque ripples are divided into the torque ripples of Tm and the torque ripples of Tr. As for the ripples of Tm=p·φa·Iq (Iq: constant) in the four-pole 24-slot motor, as shown in FIG. 6A, the ripples are of $12^{th}$-order (peaks) (=24/2) in terms of electrical angle. As for the ripples of Tm/Iq=p·φa, as shown in FIG. 6B, the ripples are of $12^{th}$-order (peaks) in terms of electrical angle.

Figure 6C:
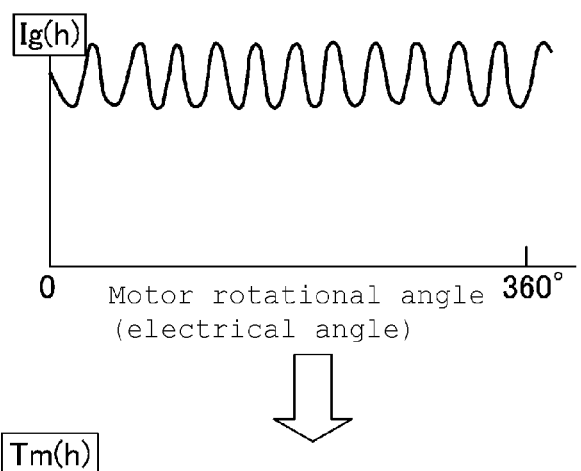
Figure 6D:
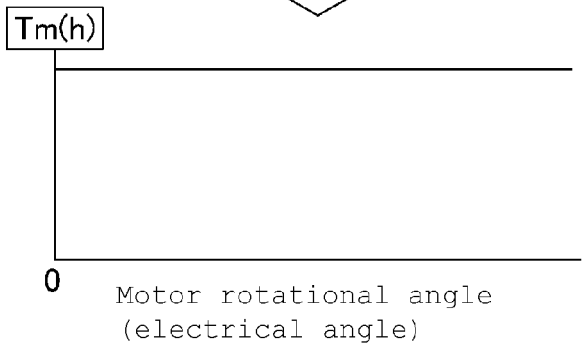

Accordingly, by multiplying the ripples by opposite-phase $12^{th}$-order Iq(h) such as the one shown in FIG. 6C, it is possible to cancel the torque ripples of Tm so that the torque ripples become zero (FIG. 6(d)). That is, in order to diminish the torque ripples of Tm, $12^{th}$-order higher harmonic wave components (first higher harmonic wave components) are added to the fundamental wave of Iq, and current command value Iq' is set as in the following equation:

$$Iq'(\theta) = Iqb(\text{fundamental wave current}) + B \sin 12(\theta + \beta)$$

(B: Higher harmonic wave amplitude coefficient, β: Phase shift, θ: Rotational angle (electrical angle))

If the torque ripples of Tm are zero and Iq at that time is Iq(h), then total torque Tt(h) is the sum of magnet torque Tm(h) associated with Iq(h) and reluctance torque Tr(h):

$$Tt(h) = Tm(h) + Tr(h)$$
$$= p \cdot \varphi a \cdot Iq(h) + p \cdot (Ld - Lq) \cdot Id \cdot Iq(h)$$

In the above equation, the torque ripples of Tm in the first term are zero and constant. On the other hand, the second term has torque ripples that contain Iq(h). That is, if the above-described Iq'(θ) is applied, the torque ripples of Tm become zero. However, the torque ripples of Tr cannot be removed by Iq(h).

Figure 7A:
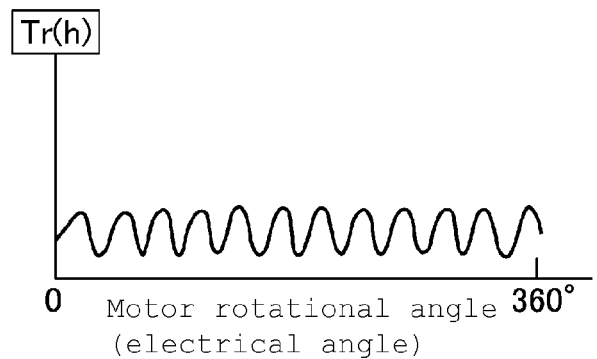
FIGS. 7A-7D are explanatory diagrams showing a process of diminishing torque ripple of Tr.
Figure 7B:
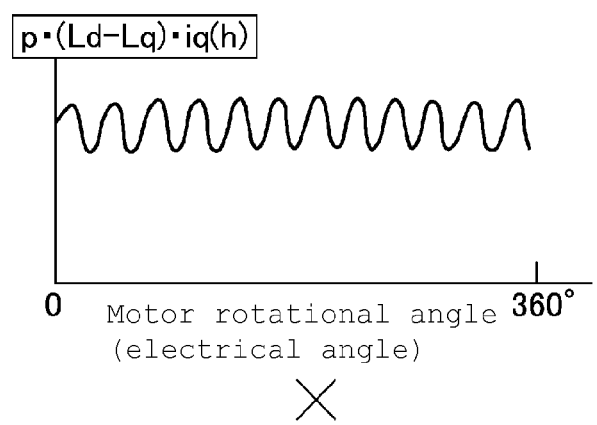
Figure 7C:
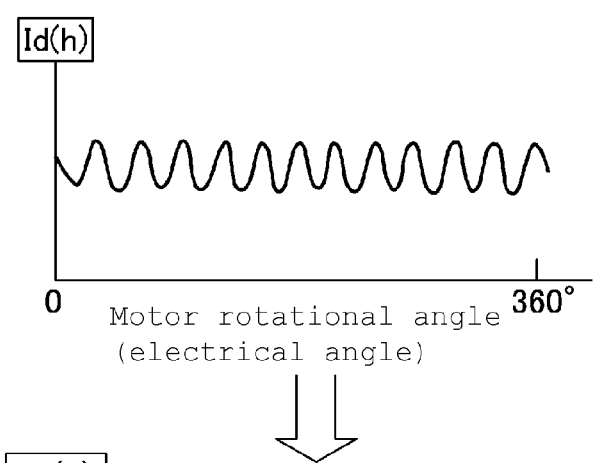
Figure 7D:
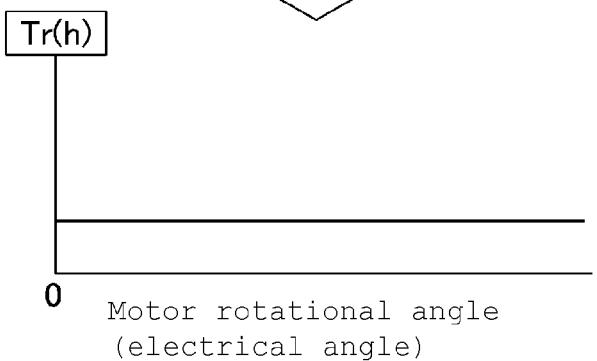

Here, Tr(h)=p·(Ld−Lq)·Id·Iq(h) will be reexamined. Even in this case, the ripples of Tr(h) in the four-pole 24-slot motor are of $12^{th}$-order in terms of electrical angle as shown in FIG. 7A, as in the above-described case. Meanwhile, if Id=constant as in normal maximum torque control, the ripples of Tr(h)/Id=p·(Ld−Lq)·Iq(h), too, are of $12^{th}$-order (peaks) in terms of electrical angle as shown in FIG. 7B. Accordingly, if the torque ripples of Tr(h) are multiplied by opposite-phase Id(h) ($12^{th}$-order) as shown in FIG. 7C, the torque ripples of Tr(h) are canceled and become zero (FIG. 7D). That is, in order to diminish the torque ripples of Tr, $12^{th}$-order higher harmonic wave components (second higher harmonic wave components) are added to the fundamental wave of Id, and current command value Id' is set in the following manner:

$$Id'(\theta)=Idb(\text{fundamental wave current})+A \sin 12(\theta+\alpha)$$

(A: Higher harmonic wave amplitude coefficient, α: Phase shift, θ: Rotational angle (electrical angle))

Here is a summary of the above points: In order to diminish the ripples of total torque Tt, first, the inventor examined conditions for reducing the ripples of Tm to zero and then reducing the ripples of Tr to zero. As a result, it was found that, to diminish the ripples of Tt, current command values Id' and Iq' should be corrected in the following manner:

$$Id'(\theta)=Idb+A \sin 12(\theta+\alpha) \quad \text{(Formula 1)}$$

$$Iq'(\theta)=Iqb+B \sin 12(\theta+\beta) \quad \text{(Formula 2)}$$

Incidentally, higher harmonic wave amplitude coefficients A and B represent the amplitudes of opposite-phase $6^{th}$-order higher harmonic wave components which are added to cancel the torque ripples. Phase shifts α and β represent phase shifts of torque-ripple waveforms of Tm and Tr from sine. In this case, the ripples of Tm and the ripples of Tr are different waveforms. Therefore, in the formulae 1 and 2, different values α and β are set.

Based on the above examination results, in the case of the system of the present invention, the base current calculation section 52 calculates Idb and Iqb (fundamental-wave current). Then, the current correction section 60 corrects Idb and Iqb, thereby setting current command values Id' and Iq'. During this process, the current correction section 60 acquires A, B, α, and β from the higher harmonic wave coefficient map 62 and the phase adjustment map 63 based on the detection current value (phase current value), and calculates current command values Id' and Iq'. In the higher harmonic wave coefficient map 62, the relation between phase current values and higher harmonic wave amplitude coefficients A and B is stored. In the phase adjustment map 63, the relation between phase current values and phase shifts α and β is stored. The current correction section 60 calculates current command values Id' and Iq' based on the formulae 1 and 2.

Figure 8:
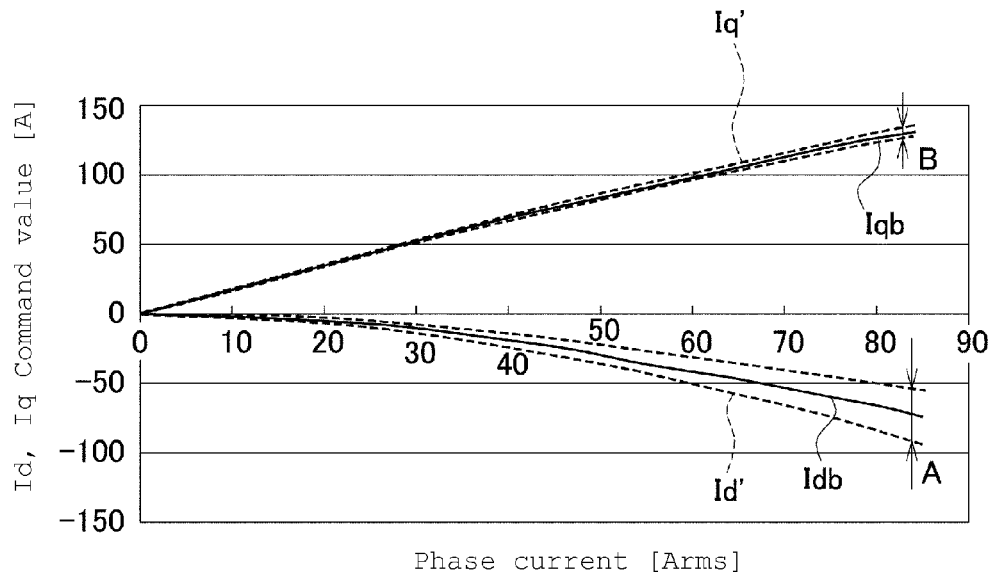
FIG. 8 is a graph showing the relationship between phase current values and Idb and Iqb and Id' and Iq'.

FIG. 8 is a graph showing relation between phase current values, Idb and Iqb, and Id' and Iq'. As shown in FIG. 8, the values of Id' and Iq' (broken line) have up-down-direction margins above and below Idb and Iqb (solid line). The upper and lower margins match a change in the value of the second term in formulae 1 and 2, or amplitudes A and B of higher harmonic wave components. To Idb and Iqb, $12^{th}$-order higher harmonic wave components of amplitudes A and B are added, and Id' and Iq' are set as indicated by broken lines in FIG. 8. In the higher harmonic wave coefficient map 62, amplitudes A and B (or width between broken lines) are stored in such a way as to be linked to phase current values. The current correction section 60 acquires higher harmonic wave amplitude coefficients A and B of formulae 1 and 2 by using the higher harmonic wave coefficient map 62, based on a phase current value detected by the current sensor 64.

Figure 9:
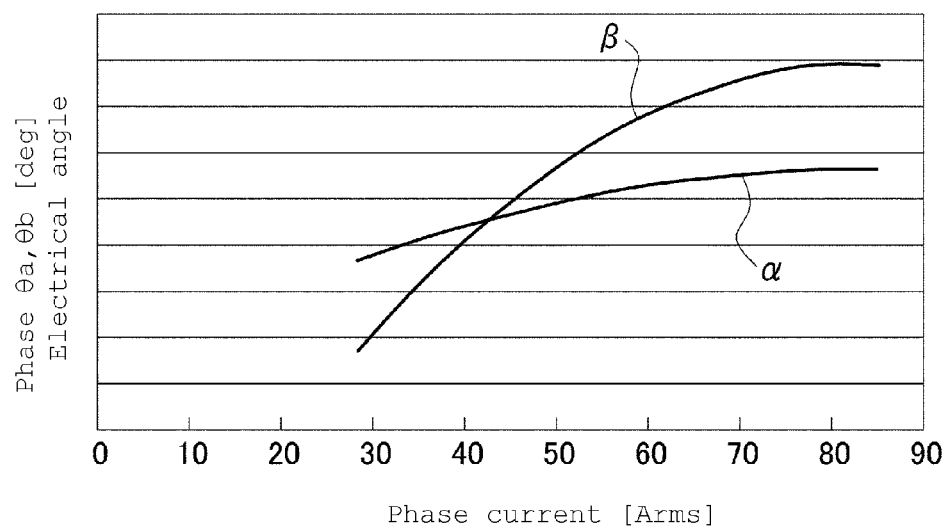
FIG. 9 is a graph showing the relationship between phase current values and α and β.

FIG. 9 is a graph showing relation between phase current values and α and β. As described above, a and are different values for Tm and Tr. Moreover, the phase varies according to phase current values. Accordingly, when Id' and Iq' are being set, a change in α and β caused by phase current values need to be taken into account. FIG. 9 shows how α and β change relative to phase current values. In the phase adjustment map 63, the relation of FIG. 9 is stored. The current correction section 60 acquires phase shifts α and β of formulae 1 and 2 by using the phase adjustment map 63, based on a phase current value detected by the current sensor 64.

Figure 10:
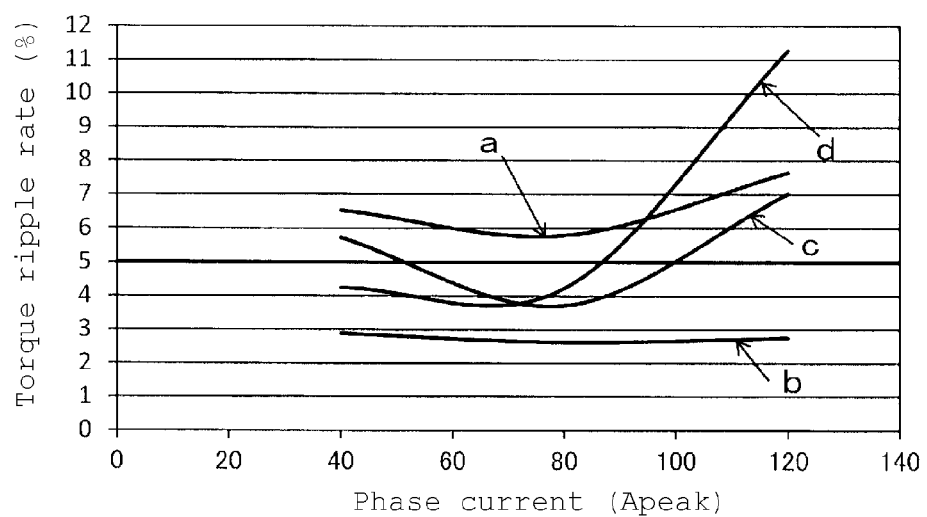
FIG. 10 is a graph showing the relationship between phase current values and torque ripple rates in each control form.

According to the above-described control form, the system of the present invention can keep the torque ripple rate in a high load region less than or equal to 5%, while using a CPU of the same level as a conventional one. FIG. 10 is a graph showing relation between phase current values and torque ripple rates in each control form. As shown in FIG. 10, in cases where only conventional maximum torque control is performed (arrow a), in a region where the phase current value exceeds 40 (Apeak), the torque ripple rate exceeds 5% in the entire current region. In cases where the control of the present invention is performed across the entire current region (arrow b), even if the phase current value exceeds 120 (Apeak), the torque ripple rate remains less than or equal to 5%. Therefore, in the EPS that uses the control method and device of the present invention, even if the load on the motor is increased by stationary steering or the like, the torque ripples do not become larger. Therefore, it is possible to improve the steering feeling.

In a motor in which current is used in a wide range, such as EPS motor, the number of rotations is very high at the low load side. If $12^{th}$-order higher harmonic waves are input across the entire region in such a motor, the higher harmonic waves might exceed a processing speed of the CPU in a high rotation speed range. Therefore, the following control form may be employed: in view of the control process at the time of a high rotation speed, only the maximum torque control may be carried out at the time of a low load (40 Arms or less) (which means that $12^{th}$-order higher harmonic wave components are not added), and, when the load exceeds 40 Arms, the process may be switched to the above control process. In this manner, the control form may be employed in such a way as to add higher harmonic waves when necessary, in order to curb the load on the CPU in the high rotational speed region. As a result, it is possible to reduce the calculation load in the control device, which is very effective in reducing the control load in the EPS motor.

Furthermore, it was found that, even when higher harmonic wave components are added only to Id or Iq and the maximum torque control is performed (only Id=Tr ripple improvement: arrow c, only Iq=Tm ripple improvement: arrow d), the torque ripple rate improves compared with cases where only the maximum torque control is performed. It is effective in reducing torque ripples to perform the former control in cases where the percentage of Tr is large, as well as to perform the latter control in cases where the percentage of Tm is large. However, as shown in FIG. 10, in both cases, the torque ripple rate exceeds 5% in the high load region. Accordingly, it was found that adding higher harmonic wave components to both is more preferred.

As described above, in the control process of the present invention, while advance angle control is being carried out in order to obtain a maximum torque, a torque ripple of Tm is considered to be separate from a torque ripple of Tr. The current command values Id' and Iq' which can diminish the respective torque ripples are set with the use of the preset correction map. In the correction map, the relation between current effective values of each phase and correction parameters is stored. The control device determines a parameter by referencing the correction map based on a detection current value. In the case of the present invention, necessary constants are mapped in advance. CPU can calculate current command values Id' and Iq' by just referencing the mapping. Therefore, the control device does not have to constantly calculate torque ripples and sequentially calculate command values to diminish the torque ripples. As a result, it is possible to significantly reduce the load on CPU when a magnet assistance-type reluctance motor is controlled.

Incidentally, the technique of the present invention can be applied not only to a motor of a 2P12S×n configuration that is based on 2P12S, such as 4P24S, but also to a motor in which ripples of 12 peaks are generated at an electrical angle of 360 degrees in exactly the same way. That is, according to the present invention, in each of motors in which a ripple waveform represented by an electrical angle is represented by the same order, regardless of the number of poles or slots, it is possible to reduce torque ripples by adding higher harmonic wave components in the same way as what is described above.

The present invention is not limited to the above-described embodiment. Needless to say, various changes may be made without departing the spirit thereof.

For example, in the above-described embodiment, as a brushless motor, an IPM-type magnet assistance-type reluctance motor is used as an example. However, the target motor is not limited to this. The present invention can be applied to a brushless motor of a type that is rotated by magnet torque that is generated by magnetic attraction force of a permanent magnet and by reluctance torque that is based on a difference in inductance between magnetic paths. For example, the present invention can be applied not only to the structure in which the magnet is embedded in the rotor, but also to a brushless motor in which a magnet is fixed on an outer periphery of a rotor.

What has been described is an example in which, as magnets 45 that are disposed inside slits 44, the magnets that are formed in advance into the shape of corresponding slits 44 are used. Instead, melted magnetic resin may be injected into each slit 44.

INDUSTRIAL APPLICABILITY

In the above-described embodiment, the present invention is applied to EPS. However, the application of the present invention is not limited to EPS. For example, the present invention may be applied to motors are used in electric cars, hybrid cars, consumer electronics such as air conditioners, and various types of industrial machinery.

EXPLANATION OF REFERENCE SYMBOLS

1: Electric power steering device (EPS)
2: Steering shaft
3: Brushless motor
4: Steering wheel
5: Steering gear box
6: Tie rod
7: Wheels
8: Assist motor unit
9: Speed reduction mechanism unit
11: Torque sensor
12: Control device (ECU)
21: Stator
22: Rotor
23: Motor case
24: Stator core
25: Tooth portion
26: Stator winding
26a: End
27: Bus bar unit (terminal unit)
28: Bracket
29: Outer-side ring portion
31: Slot
32: Insulator
33: Power supply terminal
34: Power supply wire
35: Rotational shaft
36a, 36b: Bearings
37: Rotor core
38: Resolver
39: Resolver rotor
41: Resolver stator
42: Resolver bracket
43: Mounting screw
44: Slit
45: Magnet
45n: N-pole magnet
45s: S-pole magnet
46: Magnetic pole portion
50: Control device
51: Current command section.
52: Base current calculation section
53: Vector control section
54d, 54q: PI control section
55: Coordinate axis conversion section (dq/UVW)
56: Coordinate axis conversion section (UVW/dq)
57: Inverter
58: Correction map
59: Correction component calculation section
60: Current correction section
61: Rotor rotation number calculation section
62: Higher harmonic wave coefficient map
63: Phase adjustment map
64: Current sensor
Tt: Total torque
Tm: Magnet torque
Tr: Reluctance torque
Idb, Iqb: Fundamental-wave current
A, B: Higher harmonic wave amplitude coefficient
α, β: Phase shift
Id', Iq': Current command value

The invention claimed is:
1. A method of controlling a brushless motor, the brushless motor including a stator, including an outer-side ring portion, a plurality of tooth portions protruding from the outer-side ring portion toward a radial-direction inner side, and armature windings of a plurality of phases that form a sinusoidal waveform as an induced voltage between lines via a slot formed between the tooth portions, the brushless motor further including a rotor, and a permanent magnet embedded in the rotor and disposed on an inner side of the stator in a rotatable manner, wherein the rotor is rotated by magnet torque caused by magnetic attraction force of the permanent magnet and by reluctance torque based on a difference in inductance between magnetic paths, the method comprising:
 calculating fundamental-wave current indicating a winding current value by which a maximum torque is output in the brushless motor, in accordance with a load condition of the brushless motor;
 calculating a first higher harmonic wave component having the same amplitude and the same cycle as a torque ripple caused by the magnet torque and being opposite in phase to the torque ripple, based on a correction map that shows relation between phase current of the armature winding and parameters that are used to calculate the first higher harmonic wave component;

calculating a second higher harmonic wave component having the same amplitude and the same cycle as a torque ripple caused by the reluctance torque with the first higher harmonic wave component being superimposed thereon and being opposite in phase to the torque ripple, based on a correction map that shows relation between phase current of the armature winding and parameters that are used to calculate the second higher harmonic wave component; and correcting current supplied to the armature windings by superimposing the first and second higher harmonic wave components on the fundamental-wave current.

2. The brushless motor control method according to claim 1, wherein:

the rotor includes a plurality of arc-shaped slits, a plurality of magnets housed in the slits, and a plurality of magnetic pole portions formed by the magnets and disposed along a circumferential direction of the rotor; and the slits are provided along an arc that has a center point outside the rotor, and the slits are formed inside the rotor in such a way that protruding-side portions of the slits face center of the rotor.

3. The brushless motor control method according to claim 1, wherein the correction maps include:

a higher harmonic wave coefficient map showing a relationship between phase current of the armature windings and amplitudes of the first and second higher harmonic wave components, and a phase adjustment map showing a relationship between phase current of the armature windings and phase shifts between torque ripple waveforms and the first and second higher harmonic wave components.

4. The brushless motor control method according to claim 2, wherein the correction maps include:

a higher harmonic wave coefficient map showing a relationship between phase current of the armature windings and amplitudes of the first and second higher harmonic wave components, and a phase adjustment map showing a relationship between phase current of the armature windings and phase shifts between torque ripple waveforms and the first and second higher harmonic wave components.

5. The brushless motor control method according to claim 3, wherein:

the first higher harmonic wave component is B sin 12(θ+β) (B: Higher harmonic wave amplitude coefficient, θ: Rotational angle (electrical angle), β: Phase shift) that is added to q-axis-direction fundamental-wave current Iqb;

the second higher harmonic wave component is A sin 12(θ+α) (A: Higher harmonic wave amplitude coefficient, θ: Rotational angle (electrical angle), α: Phase shift) that is added to d-axis-direction fundamental-wave current Idb;

in the higher harmonic wave coefficient map, relation between phase current of the armature windings and the higher harmonic wave amplitude coefficients A and B is stored; and in the phase adjustment map, relation between phase current of the armature windings and the phase shifts α and β is stored.

6. The brushless motor control method according to claim 4, wherein:

the first higher harmonic wave component is B sin 12(θ+β) (B: Higher harmonic wave amplitude coefficient, θ: Rotational angle (electrical angle), β: Phase shift) that is added to q-axis-direction fundamental-wave current Iqb;

the second higher harmonic wave component is A sin 12(θ+α) (A: Higher harmonic wave amplitude coefficient, θ: Rotational angle (electrical angle), α: Phase shift) that is added to d-axis-direction fundamental-wave current Idb;

in the higher harmonic wave coefficient map, relation between phase current of the armature windings and the higher harmonic wave amplitude coefficients A and B is stored; and in the phase adjustment map, relation between phase current of the armature windings and the phase shifts α and β is stored.

7. The brushless motor control method according to claim 1, wherein:

the first and second higher harmonic wave components are superimposed on the fundamental-wave current in a high load region where a torque ripple rate in the brushless motor exceeds 5%.

8. The brushless motor control method according to claim 2, wherein:

the first and second higher harmonic wave components are superimposed on the fundamental-wave current in a high load region where a torque ripple rate in the brushless motor exceeds 5%.

9. The brushless motor control method according to claim 3, wherein:

the first and second higher harmonic wave components are superimposed on the fundamental-wave current in a high load region where a torque ripple rate in the brushless motor exceeds 5%.

10. The brushless motor control method according to claim 4, wherein:

the first and second higher harmonic wave components are superimposed on the fundamental-wave current in a high load region where a torque ripple rate in the brushless motor exceeds 5%.

11. The brushless motor control method according to any one of claim 1, wherein:

the brushless motor is used as a driving source of an electric power steering device.

12. A control device of a brushless motor, the brushless motor including a stator, including an outer-side ring portion, a plurality of tooth portions protruding from the outer-side ring portion toward a radial-direction inner side, and armature windings of a plurality of phases that form a sinusoidal waveform as an induced voltage between lines via a slot formed between the tooth portions, the brushless motor further including a rotor, and a permanent magnet embedded in the rotor and disposed on an inner side of the stator in a rotatable manner, wherein the rotor is rotated by magnet torque caused by magnetic attraction force of the permanent magnet and by reluctance torque based on a difference in inductance between magnetic paths, the control device comprising:

a current sensor that detects phase current of the armature windings;

a base current calculation section that calculates fundamental-wave current indicating a winding current value by which a maximum torque is output in the brushless motor, in accordance with a load condition of the brushless motor;

a correction component calculation section that calculates, based on a phase current value detected by the current sensor, a first higher harmonic wave component having the same amplitude and the same cycle as a torque ripple caused by the magnet torque and is opposite in phase to the torque ripple, and a second higher harmonic wave component having the same amplitude and the same cycle as a torque ripple caused by the reluctance torque with the first higher harmonic wave component being superimposed thereon and is opposite in phase to the torque ripple;

a correction map that shows a relationship between the phase current and parameters used to calculate the first and second higher harmonic wave components; and a current correction section that corrects current supplied to the armature windings by superimposing the first and second higher harmonic wave components calculated by the correction component calculation section on the fundamental-wave current.

13. The brushless motor control device according to claim 12, wherein:

the rotor includes a plurality of arc-shaped slits, a plurality of magnets housed in the slits, and a plurality of magnetic pole portions formed by the magnets and disposed along a circumferential direction of the rotor; and the slits are provided along an arc having a center point outside the rotor, and the slits are formed inside the rotor in such a way that protruding-side portions of the slits face center of the rotor.

14. The brushless motor control device according to claim 12, wherein the correction map includes:

a higher harmonic wave coefficient map showing a relationship between phase current of the armature windings and amplitudes of the first and second higher harmonic wave components, and a phase adjustment map showing a relationship between phase current of the armature windings and phase shifts between torque ripple waveforms and the first and second higher harmonic wave components.

15. The brushless motor control device according to claim 13, wherein the correction map includes:

a higher harmonic wave coefficient map showing a relationship between phase current of the armature windings and amplitudes of the first and second higher harmonic wave components, and a phase adjustment map showing a relationship between phase current of the armature windings and phase shifts between torque ripple waveforms and the first and second higher harmonic wave components.

16. The brushless motor control device according to claim 12, wherein the brushless motor is used as a driving source of an electric power steering device.

17. An electric power steering device that uses, as a driving source, a brushless motor including a stator, the stator including an outer-side ring portion, a plurality of tooth portions protruding from the outer-side ring portion toward a radial-direction inner side, and armature windings of a plurality of phases forming a sinusoidal waveform as an induced voltage between lines via a slot formed between the tooth portions, the brushless motor further including a rotor, and a permanent magnet embedded in the rotor and disposed on an inner side of the stator in a rotatable manner, wherein the rotor is rotated by magnet torque caused by magnetic attraction force of the permanent magnet and by reluctance torque based on a difference in inductance between magnetic paths, the electric power steering device characterized by:

calculating fundamental-wave current indicating a winding current value by which a maximum torque is output in the brushless motor, in accordance with a load condition of the brushless motor;

calculating a first higher harmonic wave component having the same amplitude and the same cycle as a torque ripple caused by the magnet torque and being opposite in phase to the torque ripple, based on a correction map that shows relation between phase current of the armature winding and parameters that are used to calculate the first higher harmonic wave component;

calculating a second higher harmonic wave component having the same amplitude and the same cycle as a torque ripple caused by the reluctance torque with the first higher harmonic wave component being superimposed thereon and being opposite in phase to the torque ripple, based on a correction map that shows relation between phase current of the armature winding and parameters that are used to calculate the second higher harmonic wave component; and correcting current supplied to the armature windings by superimposing the first and second higher harmonic wave components on the fundamental-wave current.

18. The electric power steering device according to claim 17, wherein:

the rotor includes a plurality of arc-shaped slits, a plurality of magnets housed in the slits, and a plurality of magnetic pole portions formed by the magnets and disposed along a circumferential direction of the rotor; and the slits are provided along an arc that has a center point outside the rotor, and the slits are formed inside the rotor in such a way that protruding-side portions of the slits face center of the rotor.

* * * * *